(12) United States Patent
Jayaraman et al.

(10) Patent No.: US 12,237,849 B2
(45) Date of Patent: *Feb. 25, 2025

(54) DEVICES AND METHODS RELATED TO INTEGRATED FRONT-END ARCHITECTURE MODULES FOR CARRIER AGGREGATION

(71) Applicant: SKYWORKS SOLUTIONS, INC., Irvine, CA (US)

(72) Inventors: Srivatsan Jayaraman, Santa Clara, CA (US); Omar Mustafa, Sunnyvale, CA (US); Yalin Jin, San Jose, CA (US); Ethan Chang, Aliso Viejo, CA (US); Ying Shi, Saratoga, CA (US); Reza Kasnavi, Solana Beach, CA (US); Philip H. Thompson, Cedar Rapids, IA (US); Kenneth Norman Warren, Anamosa, IA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/137,705

(22) Filed: Apr. 21, 2023

(65) Prior Publication Data

US 2023/0387944 A1    Nov. 30, 2023

Related U.S. Application Data

(63) Continuation of application No. 17/103,546, filed on Nov. 24, 2020, now Pat. No. 11,664,829, which is a
(Continued)

(51) Int. Cl.
*H04B 1/00* (2006.01)
*H04B 7/04* (2017.01)
(Continued)

(52) U.S. Cl.
CPC ............. *H04B 1/0057* (2013.01); *H04B 7/04* (2013.01); *H04W 52/52* (2013.01); *H04W 84/042* (2013.01)

(58) Field of Classification Search
CPC ...... H04B 1/0057; H04B 7/04; H04B 1/0458; H04B 1/006; H04B 1/18; H04B 1/40;
(Continued)

(56) References Cited

U.S. PATENT DOCUMENTS 4,780,661 A    10/1988 Bolomey et al.
6,998,837 B2    2/2006 Liebau et al.
(Continued)

FOREIGN PATENT DOCUMENTS

JP    2004187129 A  *  7/2004
KR    10-1140799       5/2012

OTHER PUBLICATIONS

International Search Report dated Aug. 8, 2017 for PCT/US2016/054217.
(Continued)

*Primary Examiner* — Lana N Le
(74) *Attorney, Agent, or Firm* — Chang & Hale LLP

(57) ABSTRACT

Circuitry, modules, devices, and methods for integrating front-end carrier aggregation architecture are disclosed. In some embodiments, a method can include providing a packaging substrate configured to receive a plurality of components. The method can also include providing a front-end architecture implemented on the packaging substrate, the front-end architecture including a switching assembly configured to provide switching for two or more frequency bands, the switching assembly including at least one coupler configured to couple a signal associated with the switching assembly, and a diplexer circuit including a first filter configured to pass a first frequency band, a second filter
(Continued)

configured to pass a second frequency band, and a first electrostatic discharge network configured to dissipate electrostatic energy associated with the first and second frequency bands from the front-end architecture.

20 Claims, 12 Drawing Sheets

Related U.S. Application Data continuation of application No. 15/276,662, filed on Sep. 26, 2016, now abandoned.

(60) Provisional application No. 62/248,412, filed on Oct. 30, 2015, provisional application No. 62/233,671, filed on Sep. 28, 2015.

(51) Int. Cl.
*H04W 52/52* (2009.01)
*H04W 84/04* (2009.01)

(58) Field of Classification Search
CPC . H04B 1/48; H04B 1/525; H04B 1/52; H04B 7/18515; H04B 7/2621; H04B 1/406; H04B 17/0085; H04B 17/21; H04B 17/27; H04B 17/318; H04B 1/0064; H04B 1/0483; H04B 1/38; H04B 1/54; H04B 2001/0408; H04B 17/101; H04B 17/102; H04B 17/103; H04B 1/04; H04B 1/58; H04B 7/01; H04B 7/0413; H04B 7/0837; H04B 7/18543; H04B 7/18582; H04B 7/18593; H04W 52/52; H04W 84/042; H04L 5/16; H04L 27/04
See application file for complete search history.

(56) References Cited

U.S. PATENT DOCUMENTS

| | | | |
|---|---|---|---|
| 7,417,303 B2 | 8/2008 | Woo et al. | |
| 7,912,499 B2 | 3/2011 | Ouzillou | |
| 8,036,148 B2 | 10/2011 | Fukamachi et al. | |
| 8,842,399 B2 | 9/2014 | Jones et al. | |
| 9,391,762 B2 | 7/2016 | Rousu | |
| 10,784,903 B2* | 9/2020 | Wloczysiak | H04B 1/0057 |
| 11,265,028 B2 | 3/2022 | Uejima | |
| 11,381,218 B2 | 7/2022 | Yamaguchi et al. | |
| 11,664,829 B2* | 5/2023 | Jayaraman | H04B 7/04 455/101 |
| 2004/0203552 A1* | 10/2004 | Horiuchi | H04B 1/006 455/333 |
| 2005/0219010 A1* | 10/2005 | Erb | H04B 1/0053 333/126 |
| 2007/0058748 A1* | 3/2007 | Kim | H04B 1/52 375/295 |
| 2008/0055187 A1 | 3/2008 | Tamura et al. | |
| 2009/0093270 A1 | 4/2009 | Block et al. | |
| 2009/0207764 A1* | 8/2009 | Fukamachi | H04B 1/0057 455/78 |
| 2010/0052813 A1* | 3/2010 | Okabe | H04B 1/04 |
| 2010/0246152 A1 | 9/2010 | Lin et al. | |
| 2010/0253448 A1* | 10/2010 | Yoshikawa | H04B 1/40 |
| 2012/0074978 A1 | 3/2012 | Gentrup et al. | |
| 2012/0329407 A1* | 12/2012 | Rousu | H04B 17/102 455/90.2 |
| 2013/0120221 A1 | 5/2013 | Lindberg et al. | |
| 2013/0215808 A1 | 8/2013 | Muthukrishnan et al. | |
| 2013/0241666 A1 | 9/2013 | Granger-Jones et al. | |
| 2014/0097999 A1 | 4/2014 | Murase et al. | |
| 2014/0233441 A1 | 8/2014 | Lee et al. | |
| 2014/0307355 A1 | 10/2014 | Tsai et al. | |
| 2014/0307599 A1 | 10/2014 | Rousu | |
| 2014/0329475 A1* | 11/2014 | Ella | H04B 1/40 455/77 |
| 2014/0354348 A1 | 12/2014 | Gupta et al. | |
| 2014/0371632 A1 | 12/2014 | Al-Ali et al. | |
| 2015/0145614 A1 | 5/2015 | Whitefield et al. | |
| 2015/0270608 A1 | 9/2015 | Sub Shin | |
| 2016/0028863 A1 | 1/2016 | Zhu et al. | |
| 2016/0134308 A1 | 5/2016 | Schmidhammer | |
| 2016/0172738 A1 | 6/2016 | Srirattana et al. | |
| 2016/0269053 A1 | 9/2016 | Lee | |
| 2016/0308503 A1 | 10/2016 | Tsai | |
| 2017/0063404 A1 | 3/2017 | Langer et al. | |
| 2017/0077877 A1 | 3/2017 | Anderson | |
| 2017/0093442 A1* | 3/2017 | Jayaraman | H04B 7/04 |
| 2017/0373493 A1 | 12/2017 | Morf et al. | |
| 2018/0034499 A1 | 2/2018 | Kwon et al. | |
| 2018/0123549 A1 | 5/2018 | Takeuchi | |
| 2018/0227006 A1 | 8/2018 | Yasuda | |
| 2021/0006274 A1 | 1/2021 | Kani | |
| 2021/0337054 A1 | 10/2021 | Choi et al. | |
| 2021/0351811 A1 | 11/2021 | Vedula et al. | |
| 2022/0311455 A1 | 9/2022 | Tahara et al. | |
| 2024/0063759 A1* | 2/2024 | Singhal | H04B 1/40 |

OTHER PUBLICATIONS

Written Opinion dated Aug. 8, 2017 for PCT/US2016/054217.
International Preliminary Report on Patentability dated Apr. 3, 2018 for PCT/US2016/054217.

* cited by examiner

DEVICES AND METHODS RELATED TO INTEGRATED FRONT-END ARCHITECTURE MODULES FOR CARRIER AGGREGATION

CROSS-REFERENCE TO RELATED APPLICATION(S)

This application is a continuation of U.S. patent application Ser. No. 17/103,546, filed Nov. 24, 2020, entitled "INTEGRATED FRONT-END ARCHITECTURE FOR CARRIER AGGREGATION," which is a continuation of U.S. patent application Ser. No. 15/276,662, filed Sep. 26, 2016, entitled "INTEGRATED FRONT-END ARCHITECTURE FOR CARRIER AGGREGATION," now abandoned, which claims priority to U.S. Provisional Application No. 62/233,671, filed Sep. 28, 2015, entitled "INTEGRATED FRONT-END ARCHITECTURE FOR CARRIER AGGREGATION," and to U.S. Provisional Application No. 62/248,412, filed Oct. 30, 2015, entitled "INTEGRATED FRONT-END ARCHITECTURE FOR CARRIER AGGREGATION," the disclosure of each of which is hereby expressly incorporated by reference herein in its entirety.

BACKGROUND

Field

The present disclosure relates to circuitry to support cellular carrier aggregation over a single path.

Description of the Related Art

Cellular carrier aggregation (CA) can be supported by allowing two or more radio-frequency (RF) signals to be processed through a common path. For example, CA can involve use of a path for a plurality of bands having frequency ranges that are sufficiently separated. In such a configuration, simultaneous operation of more than one band is possible.

SUMMARY

In accordance with some implementations, the present disclosure relates to a front-end architecture comprising a switching assembly configured to provide switching for two or more frequency bands, where the switching assembly includes at least one coupler configured to couple a signal associated with the switching assembly. The front-end architecture further includes a diplexer circuit including a first filter configured to pass a first frequency band, a second filter configured to pass a second frequency band, and a first electrostatic discharge (ESD) network configured to dissipate electrostatic energy associated with the first and second frequency bands from the front-end architecture.

In some embodiments, the switching assembly includes a first antenna switch module (ASM) configured to provide switching for the first frequency band, the first ASM including a first coupler configured to couple a signal associated with the first ASM, and a second ASM configured to provide switching for the second frequency band, the second ASM including a second coupler configured to couple a signal associated with the second ASM.

In some embodiments, the first antenna switch module is included on a first die, the second antenna switch module is included on a second die, and the diplexer circuit is included on a third die. In some embodiments, the first filter is coupled to the first antenna switch module and the second filter is coupled to the second antenna switch module. In some embodiments, the first filter and the second filter are coupled to a common antenna.

In some embodiments, a multiplexor assembly configured to select a signal from one of the first coupler or the second coupler for output to a coupler output node. In some embodiments, a power amplifier assembly including a first power amplifier for a transmission signal associated with the first frequency band, a second power amplifier for transmission signal associated with the second frequency band, and a matching network.

In some embodiments, the first power amplifier is coupled to a transmission node of the first antenna switch module and second power amplifier is coupled to a transmission node of the second antenna switch module. In some embodiments, the power amplifier assembly is included on a fourth die.

In some embodiments, the switching assembly includes a first antenna switch module configured to provide switching for the first frequency band, the first antenna switch module including a first coupler configured to couple a signal associated with the first antenna switch module, a second antenna switch module configured to provide switching for the second frequency band, the second antenna switch module including a second coupler configured to couple a signal associated with the second antenna switch module, and a third antenna switch module configured to provide switching for a third frequency band, the third antenna switch module including a third coupler configured to couple a signal associated with the third antenna switch module.

In some embodiments, the first antenna switch module is included on a first die, the second antenna switch module and the third antenna switch module are included on a second die, and the diplexer circuit is included on a third die. In some embodiments, the diplexer circuit also includes a second electrostatic discharge network configured to dissipate electrostatic energy associated with the third frequency band from the front-end architecture.

In some embodiments, the first filter is coupled to the first antenna switch module, the second filter is coupled to the second antenna switch module, and the second electrostatic discharge network is coupled to the third antenna switch module. In some embodiments, the first filter and the second filter are coupled to a first antenna, and the second electrostatic discharge network is coupled to a second antenna.

In some embodiments, the first electrostatic discharge network is coupled to the first and second filters. In some embodiments, at least a portion of the diplexer circuit is conjugately matched with the antenna switch assembly. In some embodiments, one or more ports of the antenna switch assembly include integrated notch filters. In some embodiments, the at least one coupler is bidirectional. In some embodiments, at least one of the first filter and the second filter is an elliptic filter.

In accordance with some implementations, the present disclosure relates to a radio-frequency module that includes a packaging substrate configured to receive a plurality of components and a front-end architecture implemented on the packaging substrate. In some implementations, the front-end architecture includes a switching assembly configured to provide switching for two or more frequency bands, where the switching assembly includes at least one coupler configured to couple a signal associated with the switching assembly. The front-end architecture includes a diplexer circuit including a first filter configured to pass a first frequency band, a second filter configured to pass a second frequency band, and a first electrostatic discharge network configured to dissipate electrostatic energy associated with the first and second frequency bands from the front-end architecture.

In some embodiments, the radio-frequency module is a front-end module (FEM). In some embodiments, the switching assembly includes a first antenna switch module configured to provide switching for the first frequency band, the first antenna switch module including a first coupler configured to couple a signal associated with the first antenna switch module, and a second antenna switch module configured to provide switching for the second frequency band, the second antenna switch module including a second coupler configured to couple a signal associated with the second antenna switch module.

In some embodiments, the first antenna switch module is included on a first die, the second antenna switch module is included on a second die, and the diplexer circuit is included on a third die. In some embodiments, the first filter is coupled to the first antenna switch module and the second filter is coupled to the second antenna switch module. In some embodiments, the first filter and the second filter are coupled to a common antenna.

In some embodiments, the switching assembly includes a first antenna switch module configured to provide switching for the first frequency band. In some embodiments, the first antenna switch module includes a first coupler configured to couple a signal associated with the first antenna switch module, a second antenna switch module configured to provide switching for the second frequency band, the second antenna switch module including a second coupler configured to couple a signal associated with the second antenna switch module, and a third antenna switch module configured to provide switching for a third frequency band. In some embodiments, the third antenna switch module includes a third coupler configured to couple a signal associated with the third antenna switch module.

In some embodiments, the first antenna switch module is included on a first die, the second antenna switch module and the third antenna switch module are included on a second die, and the diplexer circuit is included on a third die. In some embodiments, the diplexer circuit also includes a second electrostatic discharge network configured to dissipate electrostatic energy associated with the third frequency band from the front-end architecture.

In some embodiments, the first filter is coupled to the first antenna switch module, the second filter is coupled to the second antenna switch module, and the second electrostatic discharge network is coupled to the third antenna switch module. In some embodiments, the first filter and the second filter are coupled to a first antenna, and the second electrostatic discharge network is coupled to a second antenna.

In some embodiments, a radio-frequency device includes a transceiver configured to process radio-frequency signals and a radio-frequency module in communication with the transceiver. In some embodiments, the radio-frequency module has a front-end architecture, where the front-end architecture includes a switching assembly configured to provide switching for two or more frequency bands, the switching assembly including at least one coupler configured to couple a signal associated with the switching assembly, and a diplexer circuit including a first filter configured to pass a first frequency band, a second filter configured to pass a second frequency band, and a first electrostatic discharge network configured to dissipate electrostatic energy associated with the first and second frequency bands from the front-end architecture.

In some embodiments, the radio-frequency device includes a wireless device. In some embodiments, the wireless device is a cellular phone.

In some embodiments, the switching assembly includes a first antenna switch module configured to provide switching for the first frequency band, the first antenna switch module including a first coupler configured to couple a signal associated with the first antenna switch module, and a second antenna switch module configured to provide switching for the second frequency band, the second antenna switch module including a second coupler configured to couple a signal associated with the second antenna switch module.

In some embodiments, the first antenna switch module is included on a first die, the second antenna switch module is included on a second die, and the diplexer circuit is included on a third die. In some embodiments, the first filter is coupled to the first antenna switch module and the second filter is coupled to the second antenna switch module. In some embodiments, the first filter and the second filter are coupled to a common antenna.

In some embodiments, the switching assembly includes a first antenna switch module configured to provide switching for the first frequency band, the first antenna switch module including a first coupler configured to couple a signal associated with the first antenna switch module, a second antenna switch module configured to provide switching for the second frequency band, the second antenna switch module including a second coupler configured to couple a signal associated with the second antenna switch module, and a third antenna switch module configured to provide switching for a third frequency band, the third antenna switch module including a third coupler configured to couple a signal associated with the third antenna switch module.

In some embodiments, the first antenna switch module is included on a first die, the second antenna switch module and the third antenna switch module are included on a second die, and the diplexer circuit is included on a third die. In some embodiments, the diplexer circuit also includes a second electrostatic discharge network configured to dissipate electrostatic energy associated with the third frequency band from the front-end architecture.

In some embodiments, the first filter is coupled to the first antenna switch module, the second filter is coupled to the second antenna switch module, and the second electrostatic discharge network is coupled to the third antenna switch module. In some embodiments, the first filter and the second filter are coupled to a first antenna, and the second electrostatic discharge network is coupled to a second antenna.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
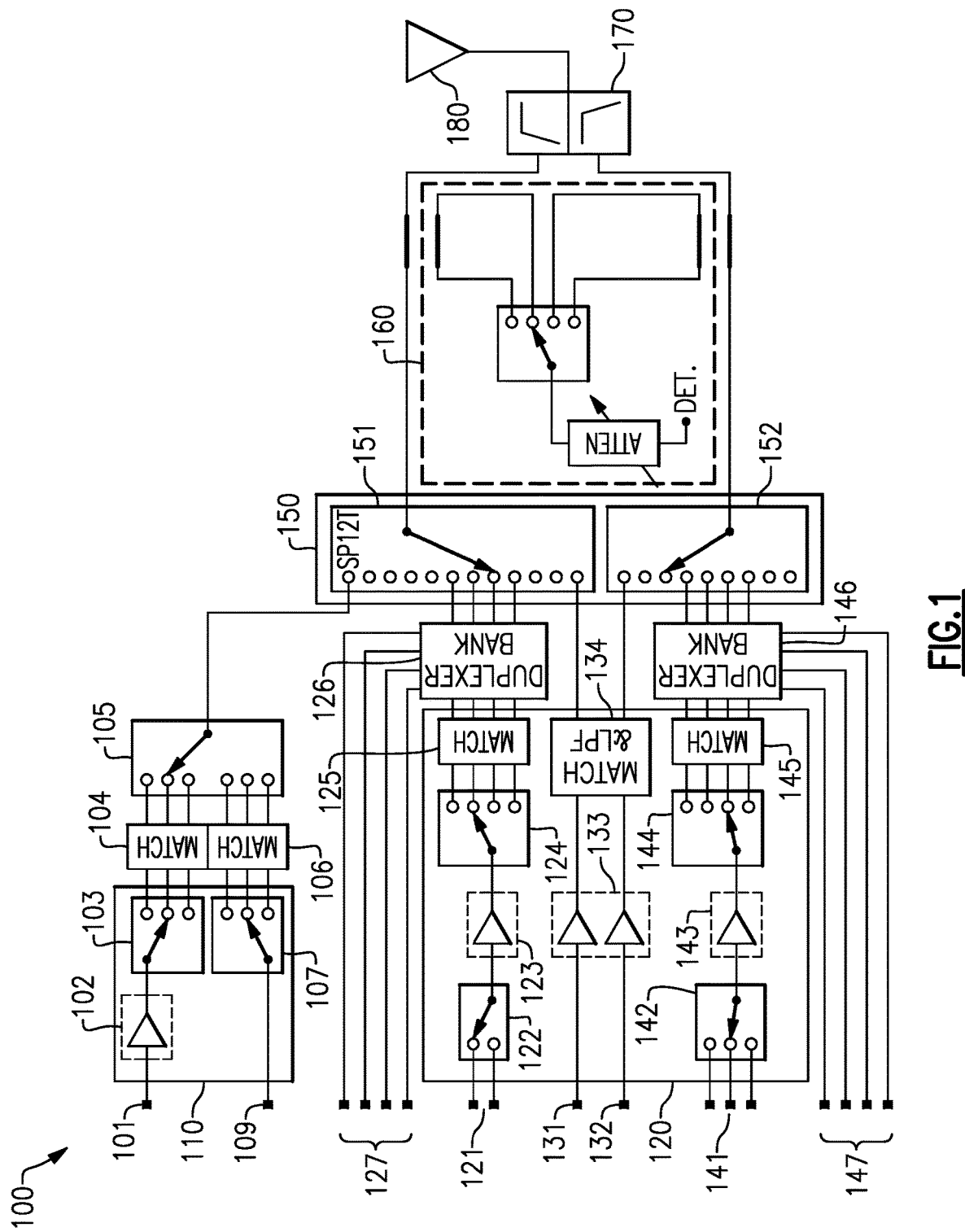
FIG. 1 is a block diagram of an example of a front-end architecture configured to operate with a common antenna according to some implementations.

The headings provided herein, if any, are for convenience only and do not necessarily affect the scope or meaning of the claimed invention.

Cellular carrier aggregation (CA) can be supported by allowing two or more radio-frequency (RF) signals to be processed through a common path. For example, CA can involve use of a path for a plurality of bands having frequency ranges that are sufficiently separated. In such a configuration, simultaneous operation of more than one band is possible.

In some implementations, the present disclosure relates to a front-end architecture that can be configured to support CA of two or more cellular bands. CA for 4G LTE has very stringent spurious requirement to keep the receiver de-sense down to acceptable levels. As one example, when B12/B17 is operating along with B4 RX (reception), then the 3rd harmonic of B12/B17 can fall into the B4 RX path and de-sense the receiver. In order to achieve acceptable level of de-sense (e.g., 0.5 dB), 3rd harmonic of TX (transmission) at the B4 receiver needs to be below, for example, −125 dBm. Under most circumstances, the TX harmonics are not only generated by the power amplifier (PA) but also the antenna switch module (ASM). However, suppressing harmonics to such low levels is challenging.

Traditionally such level of de-sense has been achieved by adding filtering at various stages of the front-end such as at the post-PA, post-ASM, and diplexer stages. However, this approach is not optimal because stacking multiple filters throughout the front-end results in excessive losses. This is further complicated by the different approaches used by various platforms to recover the lost efficiency.

Previous solution for meeting the receiver de-sense requirement in CA application include a discrete line-up consisting of a 4G multi-mode power amplifier (MMPA), duplexer, ASM, diplexer, coupler, and electrostatic discharge (ESD) network. Additional filtering is included throughout the line-up to meet the overall filtering requirements. While this technique is effective in suppressing spurious signals, it introduces additional loss in the front-end. This additional loss results in lower efficiency, which in turn leads to poor battery life.

An envelope tracking (ET) PA is usually used to improve the efficiency lost in the front-end. ET PAs work on the principle of tracking the envelope of the modulated signal and modulating the supply voltage of the PA accordingly. Supply modulation is an extremely effective scheme, as by lowering the dc collector voltage in real time, it ensures the minimum overlap of the collector voltage and current waveforms thereby boosting power added efficiency (PAE).

However, different platforms adopt different approaches to implement ET. For instance, some platforms modulate the supply of voltage every gain stage in the power amplifier to maximize efficiency. On the other hand, some platforms only modulate the output gain stage to reduce the complexity introduced by modulating all stages. Additionally, different platforms adopt different approaches to meet the receiver de-sense requirement resulting in custom components designed to work with each platform. This increases the overall cost of development.

The present disclosure solves the problem of receiver de-sense in CA applications while reducing losses by integrating the PA, ASM, diplexer, coupler and ESD network into a single multi-chip front-end module. This innovation also incorporates all the features needed to work across multiple platforms.

FIG. 1 is a block diagram of an example of a front-end architecture 100 configured to operate with a common antenna 180 according to some implementations. More particularly, a power amplifier (PA) path 110 is shown to be configured to provide TX (transmission) and RX (reception) operations, where an input signal to be amplified is provided at an input node 101. A PA 102 (e.g., associated with a high-band (HB) TX signal) can amplify such an input signal, and the amplified signal is shown be provided to a band-selection switch 103 (e.g., a single-pull three-throw (SP3T) switch) configured to allow HB TX operation. A match network 104 is shown to be provided between the band-selection switch 103 and a mode selection switch 105. When the mode selection switch 105 is operated in the TX mode, the amplified and matched HB TX signal can be routed to the antenna 180 for transmission via the first antenna switch module (ASM) 151 of the antenna switch assembly 150 and the diplexer 170. When the mode selection switch 105 is operated in the RX mode, a signal received through the antenna 180 can be routed to the output node 109 through the filter 106 and the band-selection switch 107 (e.g., a single-pull three-throw (SP3T) switch).

In some implementations, the diplexer 170 is a discrete component on the printed circuit board (PCB) on which the front-end architecture 100 is implemented. In some implementations, the diplexer 170 is associated with an external electrostatic discharge (ESD) network. In some implementations, the front-end architecture 100 includes a matching network between the antenna switch assembly 150 and the diplexer 170 configured to increase harmonic rejection and add filtering for harmonically related carrier architecture (CA) cases.

A PA path 120 is shown to be configured to facilitate other TX and RX operations. In some implementations, one or more input signals to be amplified are provided at input nodes 121 to a signal selection switch 122 (e.g., a single-pull two-throw (SP2T) switch). A PA 123 can amplify such an input signal (e.g., a high band (HB) 3G TX signal), and the amplified signal is shown be provided to a band selection switch 124 (e.g., a single-pull four-throw (SP4T) switch) configured to allow HB 3G TX operation. A matching network 125 is shown to be provided between the band selection switch 124 and a duplexer bank 126. In some implementations, when the first ASM 151 of the antenna switch assembly 150 is operated in TX mode, the amplified and matched HB 3G TX signal can be routed to the antenna 180 for transmission via the diplexer 170. In some implementations, when the first ASM 151 of the antenna switch assembly 150 is operated in RX mode, a signal received through the antenna 180 can be routed to the output nodes 127 through the duplexer bank 126.

In some implementations, a signal to be amplified is provided at an input node 131, and/or another signal to be amplified is provided at an input node 132. A PA assembly 133 can amplify such input signals (e.g., a high band (HB) 2G TX signal and a low band (LB) 2G TX signal, respectively), and the amplified signals are shown be provided to a matching network and low pass filter (LPF) assembly 134 configured to allow LB/HB 2G TX operations. In some implementations, when the first ASM 151 of the antenna switch assembly 150 is operated in TX mode, the amplified and matched HB 2G TX signal can be routed to the antenna 180 for transmission via the diplexer 170. In some implementations, when the second ASM 152 of the antenna switch assembly 150 is operated in TX mode, the amplified and matched LB 2G TX signal can be routed to the antenna 180 for transmission via the diplexer 170.

In some implementations, one or more input signals to be amplified are provided at input nodes 141 to a signal selection switch 142 (e.g., a single-pull three-throw (SP3T) switch). A PA 143 can amplify such an input signal (e.g., a B26/B20/B8 TX signal), and the amplified signal is shown be provided to a band selection switch 144 (e.g., a single-pull four-throw (SP4T) switch) configured to allow TX operation. A matching network 145 is shown to be provided between the band selection switch 144 and a duplexer bank 146. In some implementations, when the second ASM 152 of the antenna switch assembly 150 is operated in TX mode, the amplified and matched TX signal can be routed to the antenna 180 for transmission via the diplexer 170. In some implementations, when the second ASM 152 of the antenna switch assembly 150 is operated in RX mode, a signal received through the antenna 180 can be routed to the output nodes 147 through the duplexer bank 146.

In some implementations, a coupler assembly 160 is provided between the antenna switch assembly 150 and the diplexer 170. In some implementations, the coupler assembly 160 is a discrete component with separate routing on the PCB on which the front-end architecture 100 is implemented.

Figure 2:
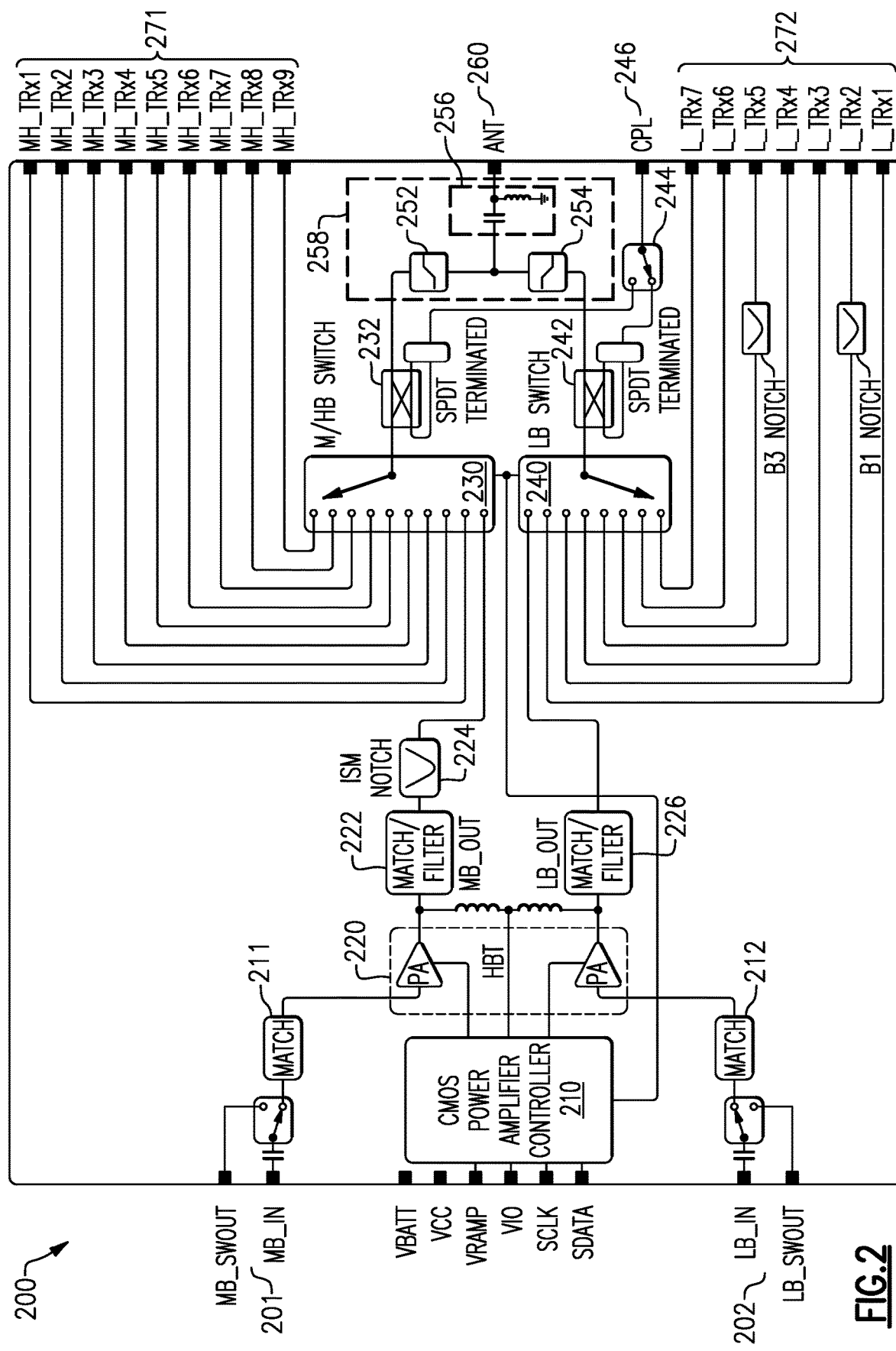
FIG. 2 is a block diagram of an example of a first front-end architecture configured to operate with a single antenna according to some implementations.

FIG. 2 is a block diagram of an example of a front-end architecture 200 configured to operate with a single antenna 260 according to some implementations. According to some implementations, a medium band (MB) input signal to be amplified is provided at an input node 201, and a low band (LB) input signal to be amplified is provided at an input node 202. A matching network 211 is provided between the input node 201 and a power amplifier (PA) assembly 220, and a matching network 212 is provided between the input node 202 and the PA assembly 220. The PA assembly 220 (e.g., including two or more PAs) is configured to amplify the LB and MB input signals. The amplified MB signal is routed via a matching and filter network 222 and an industry science and medicine (ISM) band filter 224 to an antenna switch module (ASM) 230, which is configured to allow MB and high band (HB) TX operations. When the ASM 230 is operating in TX mode, the amplified MB signal is routed to the antenna 260 for transmission through a diplexer circuit 258.

In some implementations, the diplexer circuit 258 includes a first elliptic filter 252, a second elliptic filter 254, and an electrostatic discharge (ESD) network 256. In some implementations, the impedance of at least a portion of the diplexer circuit 258 is conjugately matched to the ASM 230 in order to reduce insertion loss without the need for a matching network between the ASM 230 and the diplexer circuit 258. The diplexer circuit 258 is described in more detail with reference to FIG. 3. In some implementations, the amplified MB signal is also routed to the coupler node 246 via the coupler 232 and the coupler selection switch 244 (e.g., a single pole two-throw (1P2T) switch). The coupler 232 is described in more detail with reference to FIG. 4.

When the ASM 230 is operating in RX mode, a signal received through the antenna 260 can be routed to the output nodes 271 through the diplexer circuit 258. In some implementations, the received signal is also routed to the coupler node 246 via the coupler 232 and the coupler selection switch 244.

The amplified LB signal is routed via a matching and filter network 226 to ASM 240, which is configured to allow LB TX operation. When the ASM 240 is operating in TX mode, the amplified LB signal is routed to the antenna 260 for transmission through the diplexer circuit 258. In some implementations, the impedance of at least a portion of the diplexer circuit 258 is conjugately matched to the ASM 240 in order to reduce insertion loss without the need for a matching network between the ASM 240 and the diplexer circuit 258. In some implementations, the amplified LB signal is also routed to the coupler node 246 via the coupler 242 and the coupler selection switch 244. The coupler 242 is described in more detail with reference to FIG. 4.

When the ASM 240 is operating in RX mode, a signal received through the antenna 260 can be routed to the output nodes 272 through the diplexer circuit 258. In some implementations, the received signal is also routed to the coupler node 246 via the coupler 242 and the coupler selection switch 244.

In some implementations, the PA assembly 220, the ASM 230, and the ASM 240 are controlled by a controller 210. In some implementations, the controller 210 supports buck down operations to maintain high efficiency. In some implementations, at least some of the ports of ASMs 230 and 240 include integrated notch filters configured to reduce spurious signals in order to improve battery life.

Figure 3:
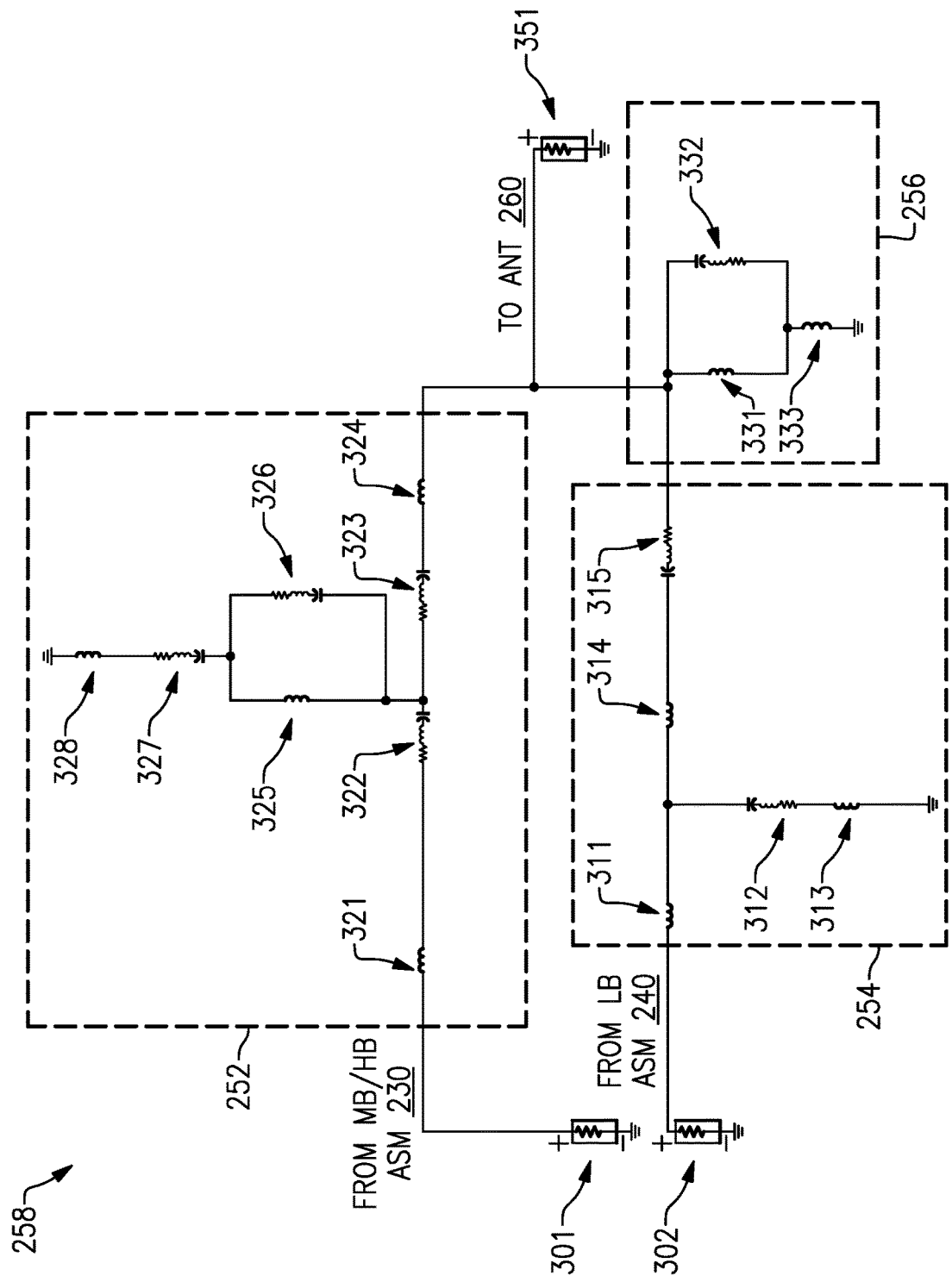
FIG. 3 is a schematic diagram of a first diplexer circuit of a front-end architecture according to some implementations.

FIG. 3 is a schematic diagram of the diplexer circuit 258 in FIG. 2 according to some implementations. In some implementations, the diplexer circuit 258 includes a node 301 from the antenna switch module (ASM) 230 in FIG. 2. As shown in FIG. 3, the MB/HB TX signal is routed through the first elliptic filter 252 to the output node 351 associated with the antenna 260. According to some implementations, the first elliptic filter 252 includes a series portion including inductance 321, resistance-inductance-capacitance 322, resistance-inductance-capacitance 323, and inductance 324. According to some implementations, the first elliptic filter 252 also includes a shunt portion with inductance 325 in parallel with resistance-inductance-capacitance 326, which are in series with resistance-inductance-capacitance 327 and inductance 328.

In some implementations, the diplexer circuit 258 also includes a node 302 from the ASM 240 in FIG. 2. As shown in FIG. 3, the LB TX signal is routed through the second elliptic filter 254 to the output node 351 associated with the antenna 260. According to some implementations, the second elliptic filter 254 includes a series portion including inductance 311, inductance 314, and resistance-inductance-capacitance 315. According to some implementations, the second elliptic filter 254 also includes a shunt portion with resistance-inductance-capacitance 312 and inductance 313. For example, the first elliptic filter 252 and the second elliptic filter 254 are third order elliptic filters. However, One of ordinary skill in the art will appreciate how the first elliptic filter 252 and the second elliptic filter 254 may be replaced with other components or filter types in order to provide the diplexer functionality to the front-end architecture 200.

In some implementations, the diplexer circuit 258 further includes the electrostatic discharge (ESD) network 256 in FIG. 2 coupled to both the first elliptic filter 252 and the second elliptic filter 254. According to some implementations, the ESD network 256 includes inductance 331 in parallel with resistance-inductance-capacitance 332, which is in series with inductance 333. One of ordinary skill in the art will appreciate how the diplexer circuit 258 operates with respect to RX signals. Such operation will not be described in detail for the sake of brevity.

Figure 4:
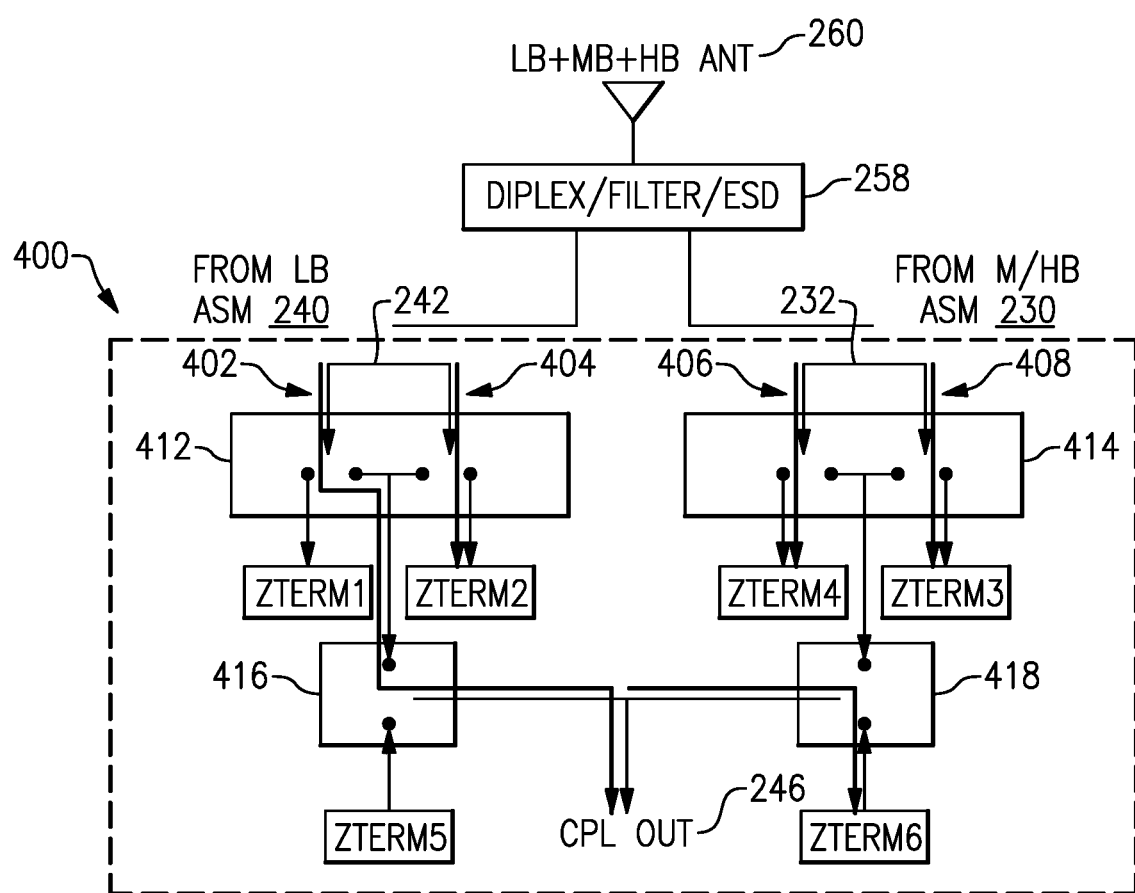
FIG. 4 is a schematic diagram of a coupler assembly according to some implementations.

FIG. 4 is a schematic diagram of a coupler assembly 400 according to some implementations. As shown in FIG. 4, the coupler assembly 400 includes the coupler 232, which couples medium band (MB) and high band (HB) TX signals from the ASM 230 or MB/HB RX signals from diplexer circuit 258. The coupler assembly 400 also includes the coupler 242, which couples low band (LB) TX signals from the ASM 240 or LB RX signals from diplexer circuit 258. The coupler assembly 400 further includes a multiplexor assembly (e.g., including multiplexors 412, 414, 416, and 418) configured to provide a coupled signal to the coupler node 246 in FIG. 2. According to some implementations, the coupler 232 operates bidirectionally as shown by input 406 from the ASM 230 and the input 408 from the diplexer 258. Similarly, according to some implementations, the coupler 242 operates bidirectionally as shown by input 402 from the ASM 240 and the input 404 from the diplexer 258.

In some implementations, the multiplexor assembly includes multiplexors 412, 414, 416, and 418. According to some implementations, the multiplexor assembly is similar to and adopted from the coupler selection switch 244 in FIG. 2. According to some implementations, the multiplexor assembly operates in place of the coupler selection switch 244 in FIG. 2.

As one example, when the ASM 240 is operating in TX mode, the LB TX signal is provided to input 402 of the coupler 242 and routed to the coupler node 246 through the multiplexors 412 and 416. Continuing with this example, the inputs 404, 406, and 408 are terminated via multiplexors 412 and 414.

Figure 5:
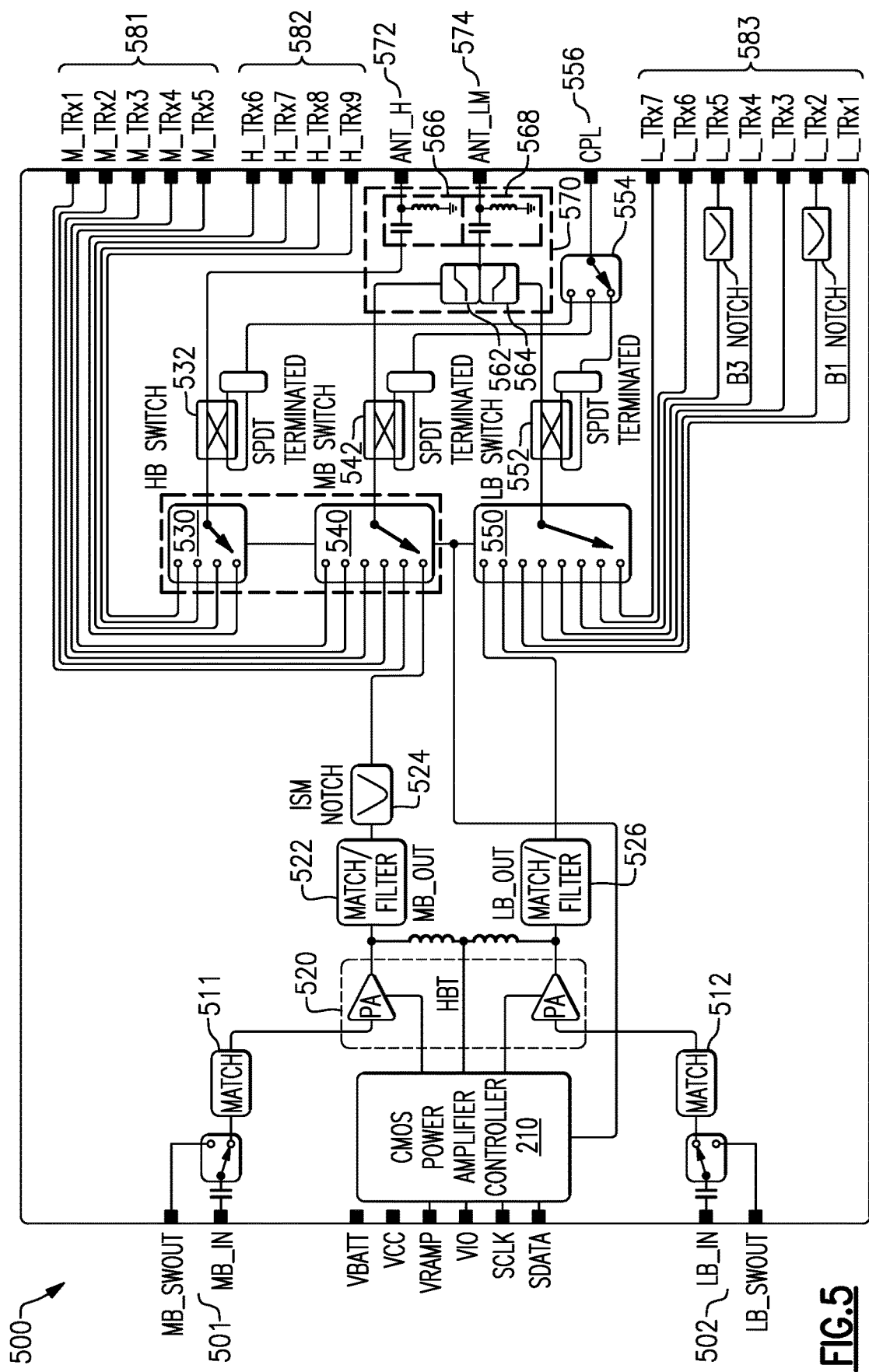
FIG. 5 is a block diagram of an example of a second front-end architecture configured to operate with two antennas according to some implementations.

FIG. 5 is a block diagram of an example of a front-end architecture 500 configured to operate with two antennas 572 and 574 according to some implementations. A medium band (MB)/high band (HB) input signal to be amplified is provided at an input node 501, and a low band (LB) input signal to be amplified is provided at an input node 502. A matching network 511 is provided between the input node 501 and a power amplifier (PA) assembly 520, and a matching network 512 is provided between the input node 502 and the PA assembly 520. The PA assembly 520 (e.g., including two or more PAs) is configured to amplify the LB and MB/HB input signals. The amplified MB/HB signal is routed via a matching and filter network 522 and an industry science and medicine (ISM) band filter 524 to an antenna switch assembly 535, which is configured to allow MB TX operation via antenna switch module (ASM) 530 and HB TX operation via ASM 540.

When the ASM 530 is operating in HB TX mode, the amplified HB signal is routed to the antenna 572 for transmission through a diplexer circuit 570. In some implementations, the impedance of at least a portion of the diplexer circuit 570 is conjugately matched to the ASM 530 in order to reduce insertion loss without the need for a matching network between the ASM 530 and the diplexer circuit 570. When the ASM 540 is operating in MB TX mode, the amplified MB signal is routed to the antenna 574 for transmission through a diplexer circuit 570. In some implementations, the impedance of at least a portion of the diplexer circuit 570 is conjugately matched to the ASM 540 in order to reduce insertion loss without the need for a matching network between the ASM 540 and the diplexer circuit 570.

In some implementations, the diplexer circuit 570 includes a first elliptic filter 562, a second elliptic filter 564, a first electrostatic discharge (ESD) network 566, and a second ESD network 568. The diplexer circuit 570 is described in more detail with reference to FIG. 6. In some implementations, the amplified HB signal is also routed to the coupler node 556 via the coupler 532 and the coupler selection switch 554 (e.g., a single pole three-throw (1P3T) switch). The coupler 532 is described in more detail with reference to FIG. 7. In some implementations, the amplified MB signal is also routed to the coupler node 556 via the coupler 542 and the coupler selection switch 554. The coupler 542 is described in more detail with reference to FIG. 7.

When the ASM 530 is operating in HB RX mode, a signal received through the antenna 572 can be routed to the output nodes 582 through the diplexer circuit 570. In some implementations, the received HB signal is also routed to the coupler node 556 via the coupler 532 and the coupler selection switch 554. When the ASM 540 is operating in MB RX mode, a signal received through the antenna 574 can be routed to the output nodes 581 through the diplexer circuit 570. In some implementations, the received MB signal is also routed to the coupler node 556 via the coupler 542 and the coupler selection switch 554.

The amplified LB signal is routed via a matching and filter network 526 to an antenna switch (ASM) 550, which is configured to allow LB TX operation. When the ASM 550 is operating in LB TX mode, the amplified LB signal is routed to the antenna 574 for transmission through the diplexer circuit 570. In some implementations, the impedance of at least a portion of the diplexer circuit 570 is conjugately matched to the ASM 550 in order to reduce insertion loss without the need for a matching network between the ASM 550 and the diplexer circuit 570. In some implementations, the amplified LB signal is also routed to the coupler node 556 via the coupler 552 and the coupler selection switch 554. The coupler 552 is described in more detail with reference to FIG. 7.

When the ASM 550 is operating in LB RX mode, a signal received through the antenna 574 can be routed to the output nodes 583 through the diplexer circuit 570. In some implementations, the received LB signal is also routed to the coupler node 556 via the coupler 552 and the coupler selection switch 554.

In some implementations, the PA assembly 520, the antenna switch assembly 535, and the ASM 550 are controlled by a controller 510. In some implementations, the controller 510 supports buck down operations to maintain high efficiency. In some implementations, at least some of the ports of ASMs 530, 540, and 550 include integrated notch filters configured to reduce spurious signals in order to improve battery life.

Figure 6:
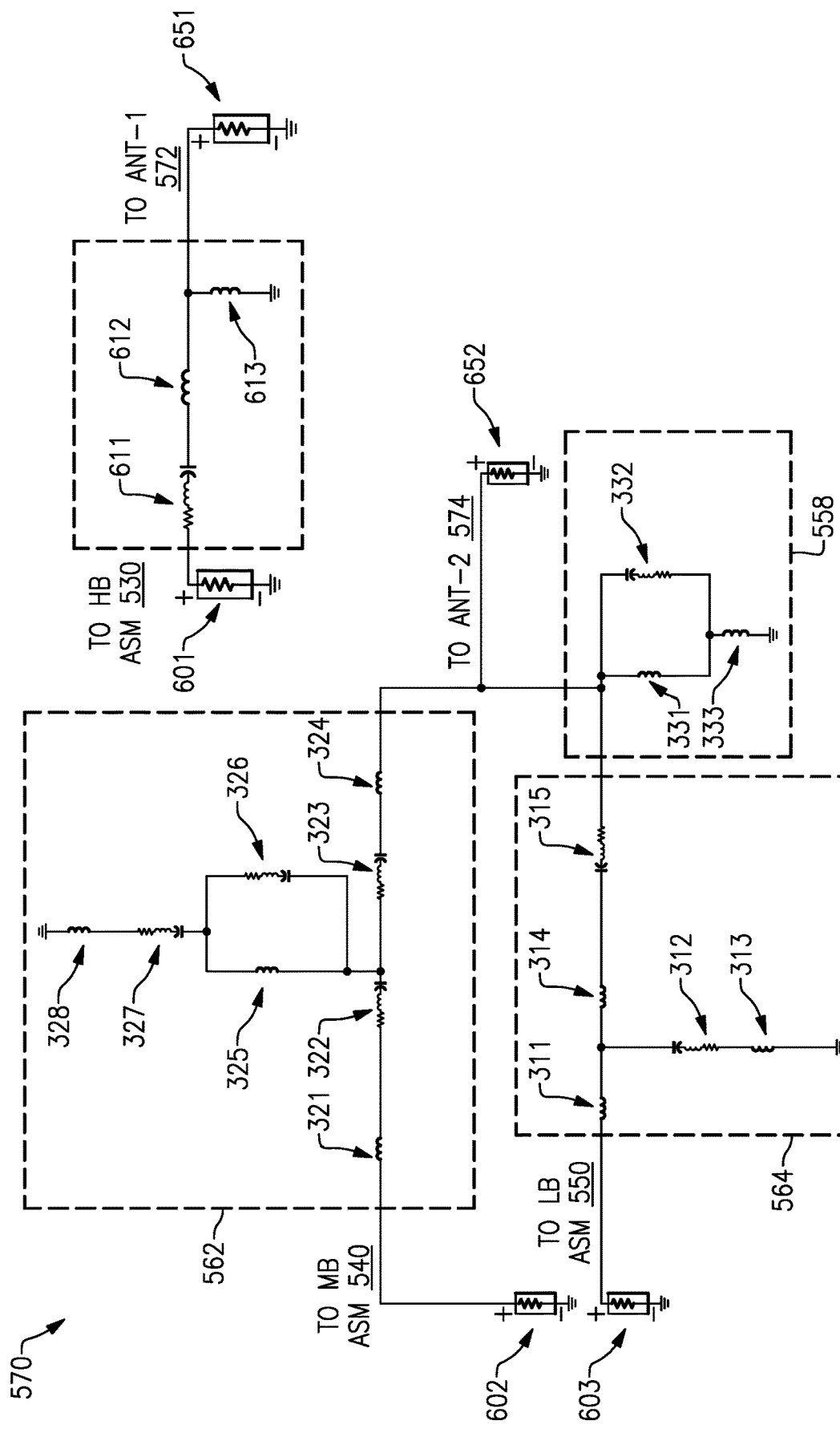
FIG. 6 is a schematic diagram of a second diplexer circuit of a front-end architecture according to some implementations.

FIG. 6 is a schematic diagram of the diplexer circuit 570 in FIG. 5 according to some implementations. In some implementations, the diplexer circuit 570 includes a node 601 associated with a high band (HB) signal from the antenna switch module (ASM) 530 in FIG. 5. As shown in FIG. 6, the HB TX signal is routed through the first electrostatic discharge (ESD) network 566 in FIG. 5 to the node 651 associated with the antenna 572. According to some implementations, the first ESD network 566 includes resistance-inductance-capacitance 611 in series with inductance 612, which is in parallel with inductance 613.

In some implementations, the diplexer circuit 570 includes a node 602 associated with a medium band (MB) signal from the ASM 540 in FIG. 5. As shown in FIG. 5, the MB TX signal is routed through the first elliptic filter 562 to the output node 652 associated with the antenna 574. According to some implementations, the first elliptic filter 562 includes a series portion including inductance 321, resistance-inductance-capacitance 322, resistance-inductance-capacitance 323, and inductance 324. According to some implementations, the first elliptic filter 562 also includes a shunt portion with inductance 325 in parallel with resistance-inductance-capacitance 326, which are in series with resistance-inductance-capacitance 327 and inductance 328.

In some implementations, the diplexer circuit 570 also includes a node 603 associated with a low band (LB) signal from the ASM 550 in FIG. 5. As shown in FIG. 5, the LB TX signal is routed through the second elliptic filter 564 to the output node 652 associated with the antenna 574. According to some implementations, the second elliptic filter 564 includes a series portion including inductance 311, inductance 314, and resistance-inductance-capacitance 315. According to some implementations, the second elliptic filter 564 also includes a shunt portion with resistance-inductance-capacitance 312 and inductance 313. For example, the first elliptic filter 562 and the second elliptic filter 564 are third order elliptic filters. However, one of ordinary skill in the art will appreciate how the first elliptic filter 562 and the second elliptic filter 564 may be replaced with other components or filter types in order to provide the diplexer functionality to the front-end architecture 500.

In some implementations, the diplexer circuit 570 further includes the second ESD network 558 in FIG. 5 coupled to both the first elliptic filter 562 and the second elliptic filter 564. According to some implementations, the second ESD network 558 includes inductance 331 in parallel with resistance-inductance-capacitance 332, which is in series with inductance 333. One of ordinary skill in the art will appreciate how the diplexer circuit 570 operates with respect to RX signals. Such operation will not be described in detail for the sake of brevity.

Figure 7:
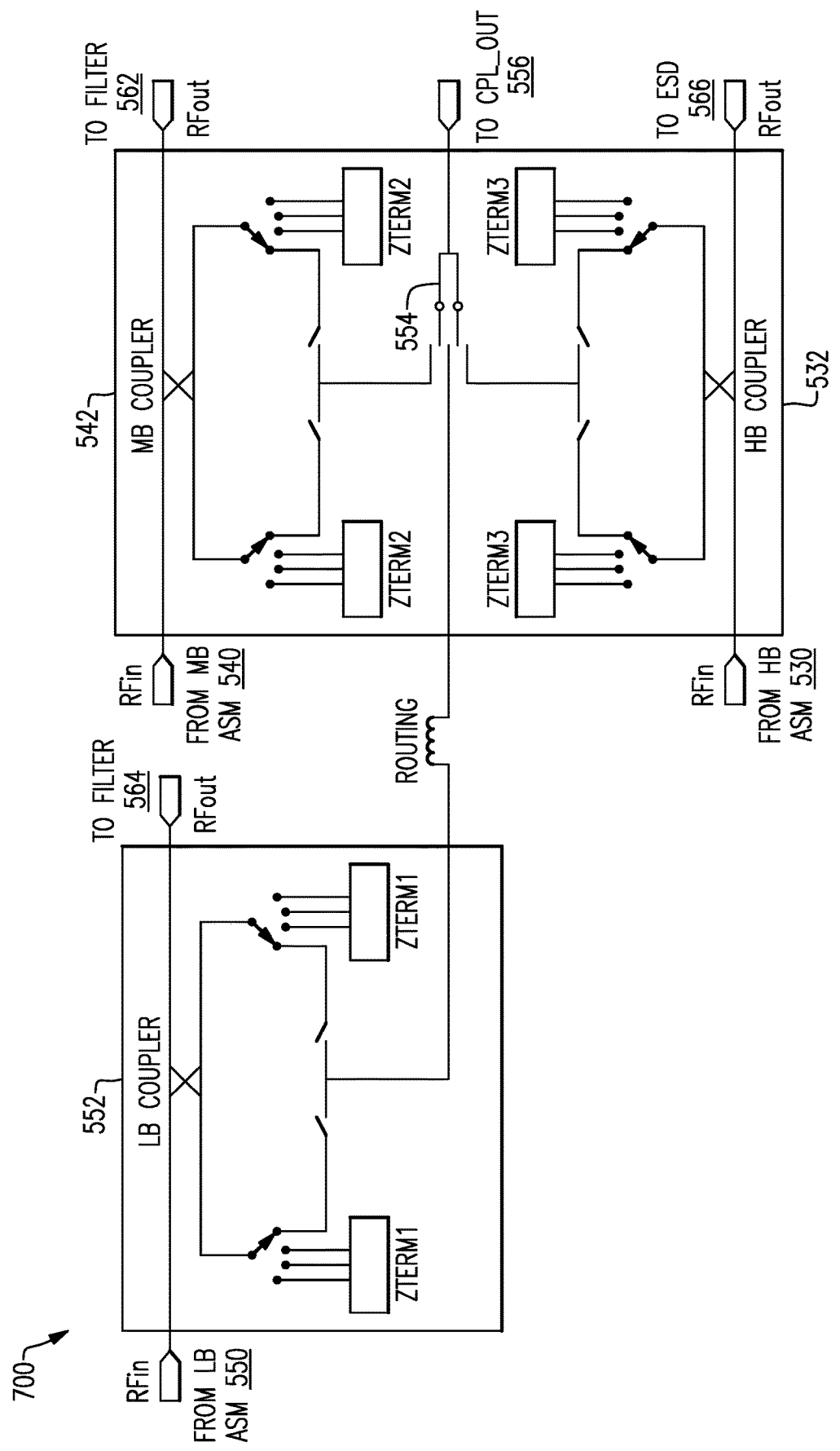
FIG. 7 is a schematic diagram of a coupler assembly according to some implementations.

FIG. 7 is a schematic diagram of a coupler assembly 700 according to some implementations. As shown in FIG. 7, the coupler assembly 700 includes the coupler 532 which couples high band (HB) TX signals from the antenna switch module (ASM) 530 or HB RX signals from the first electrostatic discharge (ESD) network 566. The coupler assembly 700 also includes the coupler 542 which couples medium band (MB) TX signals from the ASM 540 or MB RX signals from the first elliptic filter 562. The coupler assembly 700 also includes the coupler 552 which couples low band (LB) TX signals from the ASM 550 or LB RX signals from the second elliptic filter 564. The coupler assembly 400 further includes a multiplexor/switch assembly 554 configured to provide a coupled signal to the coupler node 556 in FIG. 5. According to some implementations, the couplers 532, 542, and 552 operate bidirectionally.

Figure 8:
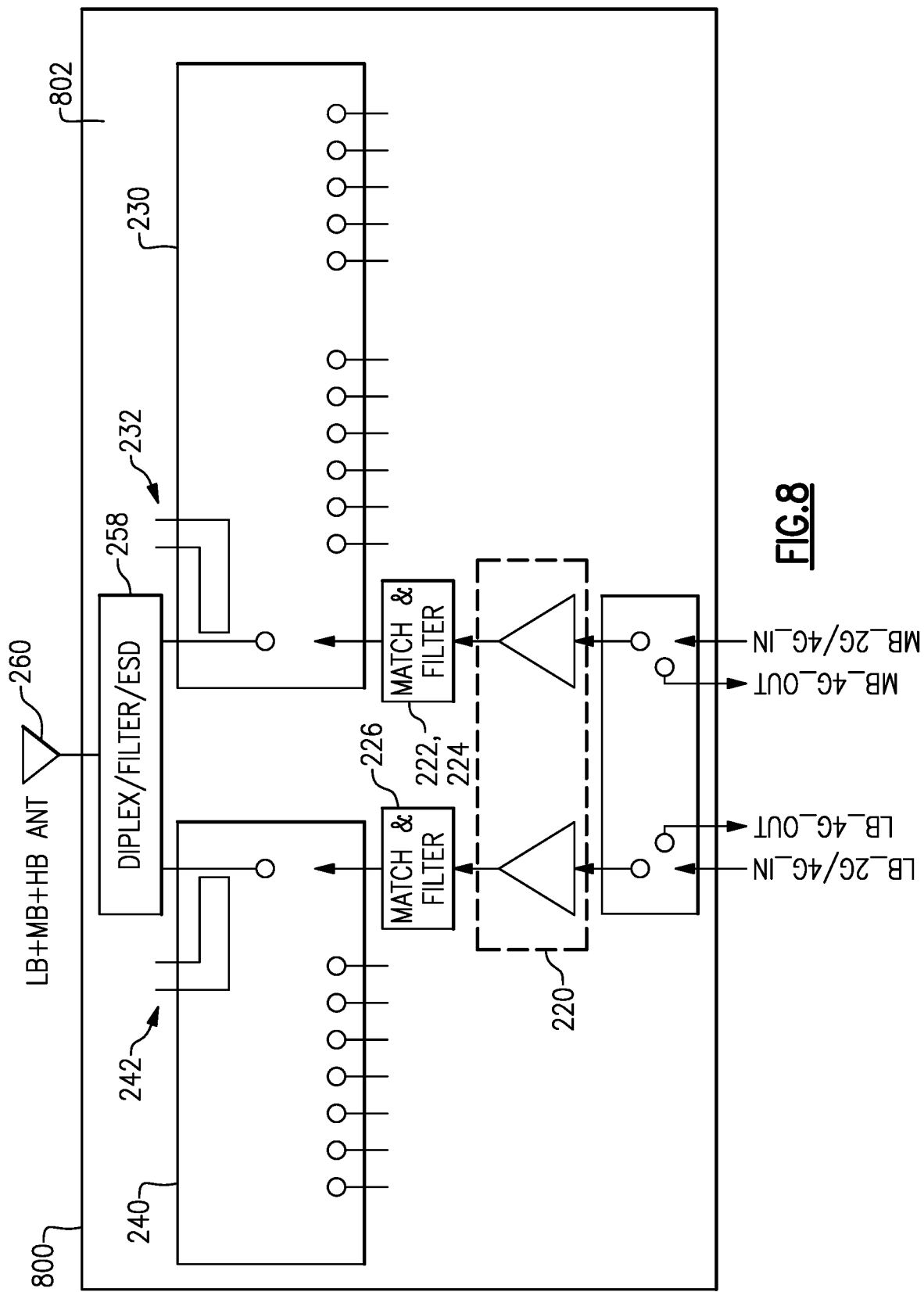
FIG. 8 is a schematic diagram of a radio-frequency (RF) module in accordance with some implementations.

FIG. 8 shows that in some implementations, one or more features of the present disclosure can be implemented in a radio-frequency (RF) module 800. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, the RF module 800, such as a front-end module (FEM) for an RF device (e.g., a wireless device), has a substrate 802 (e.g., a laminate substrate).

The RF module 800 can include a front-end architecture having one or more features as described herein (e.g., the front-end architecture 200 in FIG. 2). In some implementations, the front-end architecture can be implemented on one or more semiconductor die. For example, the power amplifier (PA) assembly 220 and the filters 222, 224, and 226 are implemented on a first semiconductor die, the antenna switch module (ASM) 230 and the coupler 232 are implemented on a second die, the ASM 240 and the coupler 242 are implemented on a third die, and the diplexer circuit 258 is implemented on a fourth die. As also described herein, such a front-end architecture can provide front-end functionalities to a common antenna 260.

In some implementations, the RF module 800 is an architecture, a device, and/or a circuit having one or more features described herein can be included in an RF device such as a wireless device. Such an architecture, a device and/or a circuit can be implemented directly in the wireless device, in one or more modular forms as described herein, or in some combination thereof.

Figure 9A:
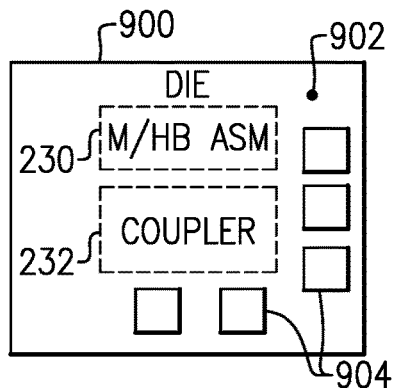
FIGS. 9A-9C are schematic diagrams of integrated circuits including portions of a first front-end architecture in accordance with some implementations.
Figure 9B:
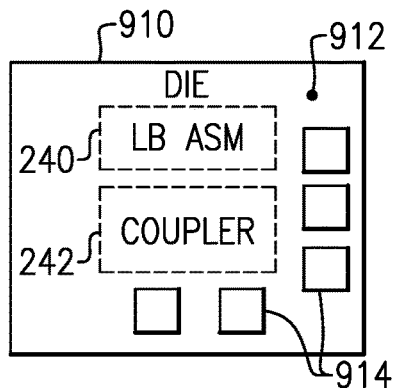
Figure 9C:
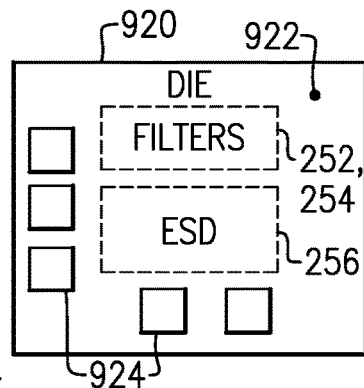

FIGS. 9A-9C are schematic diagrams of integrated circuits including portions of the front-end architecture 200 in FIG. 2 in accordance with some implementations. While some example features are illustrated, those skilled in the art will appreciate from the present disclosure that various other features have not been illustrated for the sake of brevity and so as not to obscure more pertinent aspects of the example implementations disclosed herein. To that end, for example, FIG. 9A shows that in some implementations, a portion of a front-end architecture can be part of a semiconductor die 900. By way of an example, a first portion of the front-end architecture 200 in FIG. 2 including the antenna switch module (ASM) 230 and the coupler 232 can be formed on a substrate 902 of the die 900. A plurality of connection pads 904 can also be formed on the substrate 902 to facilitate functionalities associated with at least some portions of the front-end architecture 200.

FIG. 9B shows that in some implementations, a portion of a front-end architecture can be part of a semiconductor die 910. By way of an example, a second portion of the front-end architecture 200 in FIG. 2 including the ASM 240 and the coupler 242 can be formed on a substrate 912 of the die 910. A plurality of connection pads 914 can also be formed on the substrate 912 to facilitate functionalities associated with at least some portions of the front-end architecture 200.

FIG. 9C shows that in some implementations, a portion of a front-end architecture can be part of a semiconductor die 920. By way of an example, a third portion of the front-end architecture 200 in FIG. 2 including the diplexer circuit 258 (e.g., including the first elliptic filter 252, the second elliptic filter 254, and the electrostatic discharge (ESD) network 256) can be formed on a substrate 922 of the die 920. A plurality of connection pads 924 can also be formed on the substrate 922 to facilitate functionalities associated with at least some portions of the front-end architecture 200.

Figure 10:
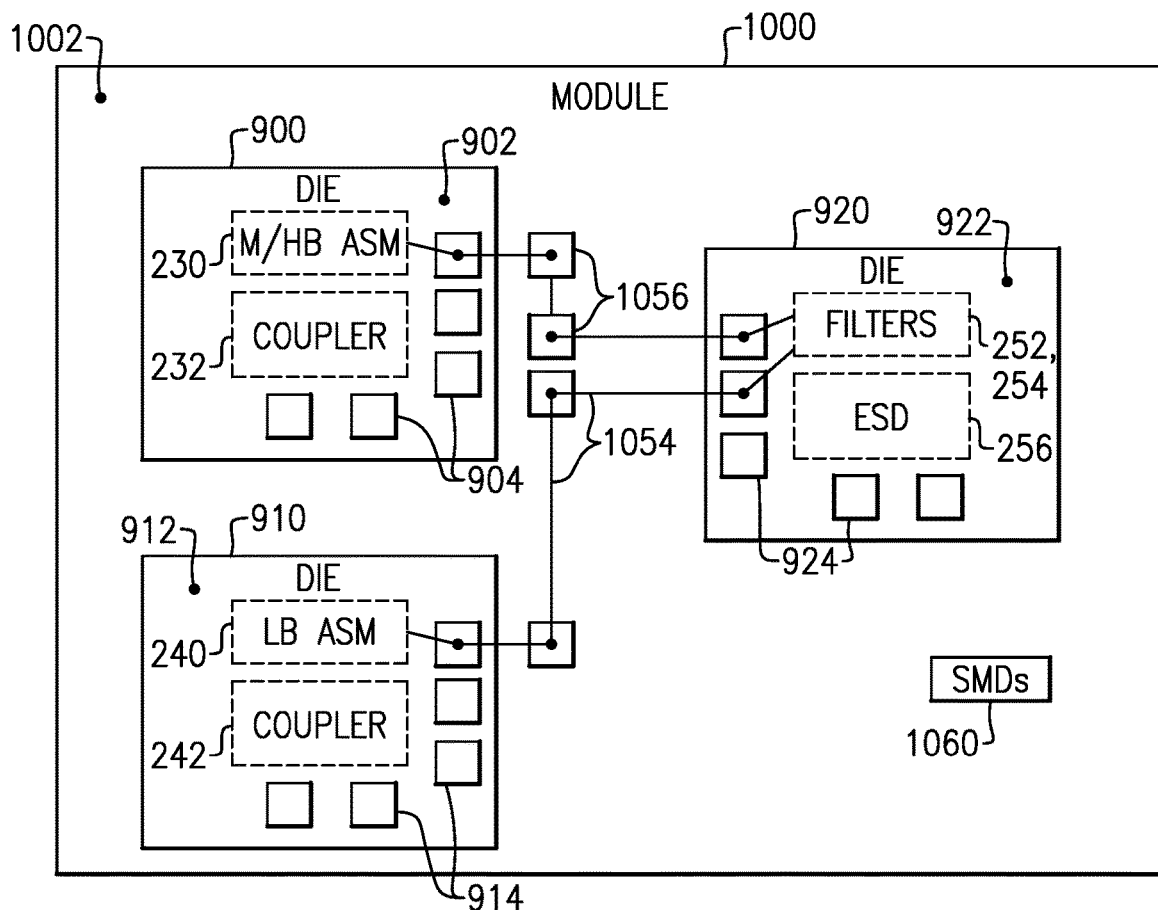
FIG. 10 is a schematic diagram of a module including the first front-end architecture in accordance with some implementations.

In some implementations, one or more features described in FIGS. 9A-9C can be included in a module. For example, FIG. 10 is a schematic diagram of a module 1000 including the front-end architecture 200 in FIG. 2 in accordance with some implementations. While some example features are illustrated, those skilled in the art will appreciate from the present disclosure that various other features have not been illustrated for the sake of brevity and so as not to obscure more pertinent aspects of the example implementations disclosed herein. The module 1100 includes: a packaging substrate 1002; a first die 900; a second die 910; a third die 920; and one or more wirebonds 1054 and one or more connection pads 1056 for connecting die 900, 910, and 920.

In some implementations, the components mounted on the packaging substrate 1002 or formed on or in the packaging substrate 1002 can further include, for example, one or more optional surface mount devices (SMDs) 1160. In some implementations, the packaging substrate 1002 can include a laminate substrate.

In some implementations, the module 1000 can also include one or more packaging structures to, for example, provide protection and facilitate easier handling of the module 1000. Such a packaging structure can include an overmold formed over the packaging substrate 1002 and dimensioned to substantially encapsulate the various circuits and components thereon.

It will be understood that although the module 1000 is described in the context of wirebond-based electrical connections, one or more features of the present disclosure can also be implemented in other packaging configurations, including flip-chip configurations.

Figure 11:
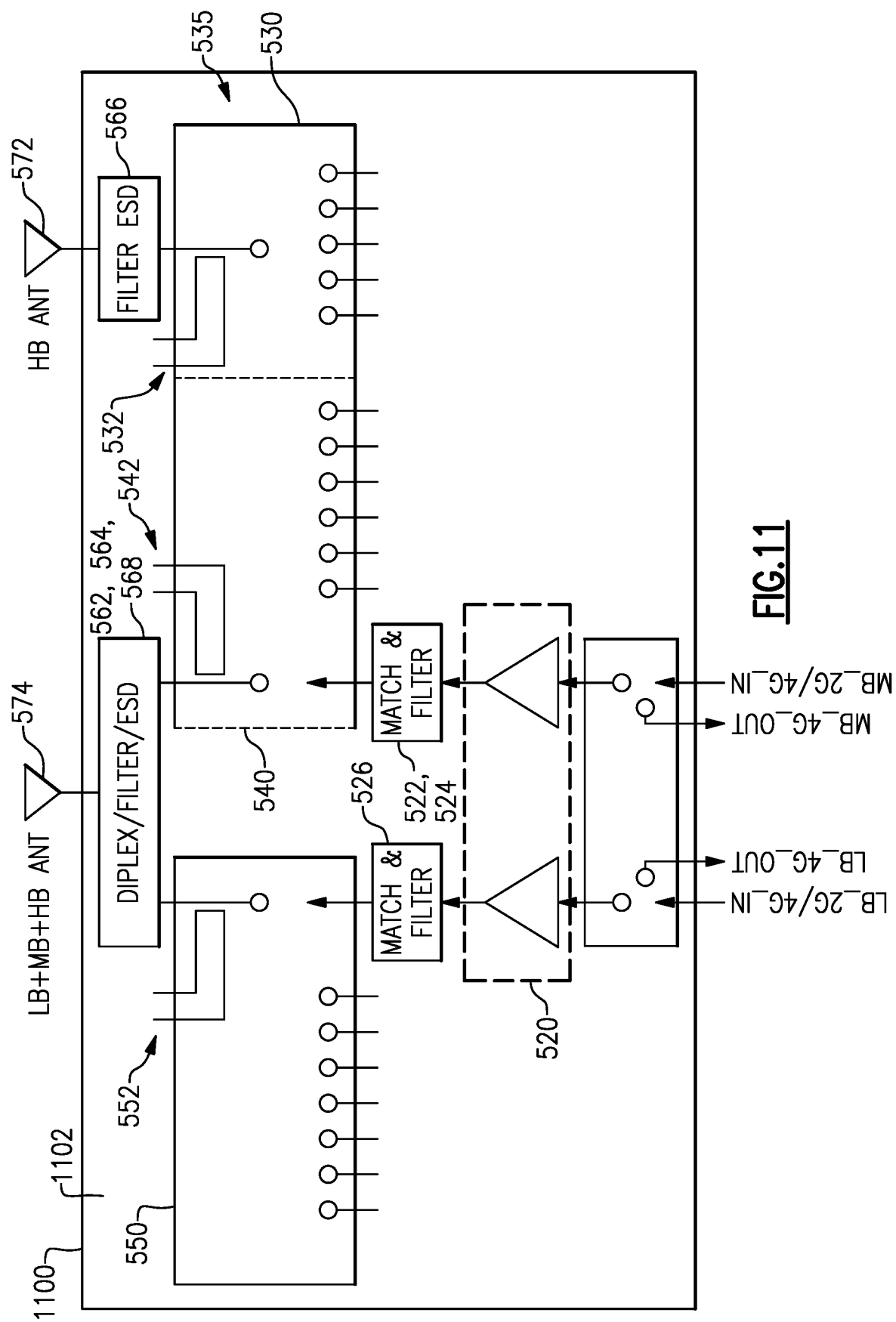
FIG. 11 is a schematic diagram of a radio-frequency (RF) module in accordance with some implementations.

FIG. 11 shows that in some implementations, one or more features of the present disclosure can be implemented in a radio-frequency (RF) module 1100. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, the RF module 1100, such as a front-end module (FEM) for an RF device (e.g., a wireless device), has a substrate 1102 (e.g., a laminate substrate).

The RF module 1100 can include a front-end architecture having one or more features as described herein (e.g., the front-end architecture 500 in FIG. 5). In some implementations, the front-end architecture can be implemented on one or more semiconductor die. For example, the power amplifier (PA) assembly 520 and the filters 522, 524, and 526 are implemented on a first semiconductor die, the antenna switch assembly 535 (e.g., including the antenna switch modules (ASMs) 530 and 540) and the couplers 532 and 542 are implemented on a second die, the ASM 550 and the coupler 552 are implemented on a third die, and the diplexer circuit 570 (e.g., including the first elliptic filter 562, the second elliptic filter, the first electrostatic discharge (ESD) network 566, and the second ESD network 568) is implemented on a fourth die. As also described herein, such a front-end architecture can provide front-end functionalities to antennas 572 and 574.

In some implementations, the RF module 1100 is an architecture, a device, and/or a circuit having one or more features described herein can be included in an RF device such as a wireless device. Such an architecture, a device and/or a circuit can be implemented directly in the wireless device, in one or more modular forms as described herein, or in some combination thereof.

Figure 12A:
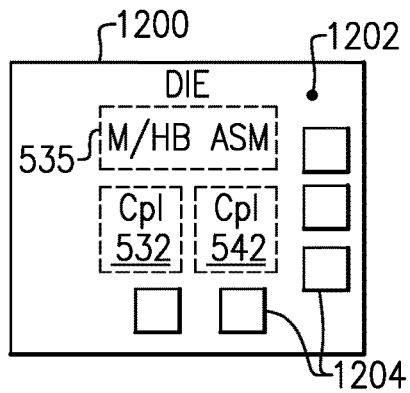
FIGS. 12A-12C are schematic diagrams of integrated circuits including portions of the second front-end architecture in accordance with some implementations.
Figure 12B:
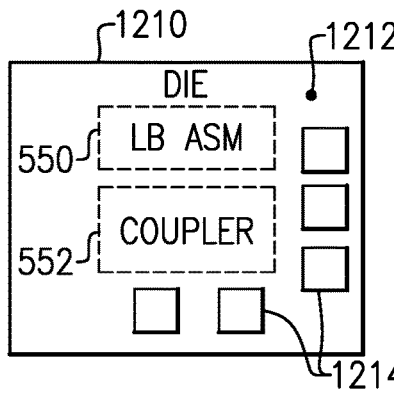
Figure 12C:
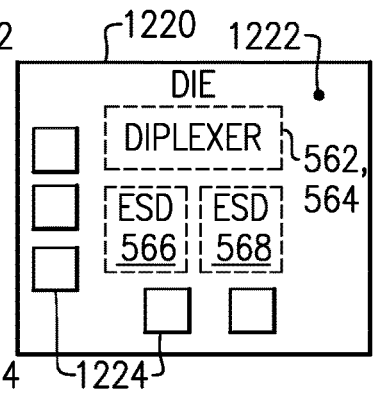

FIGS. 12A-12C are schematic diagrams of integrated circuits including portions of the front-end architecture 500 in FIG. 5 in accordance with some implementations. While some example features are illustrated, those skilled in the art will appreciate from the present disclosure that various other features have not been illustrated for the sake of brevity and so as not to obscure more pertinent aspects of the example implementations disclosed herein. To that end, for example, FIG. 10A shows that in some implementations, a portion of a front-end architecture can be part of a semiconductor die 1200. By way of an example, a first portion of the front-end architecture 500 in FIG. 5 including the antenna switch assembly 535 (e.g., including the antenna switch modules (ASMs) 530 and 540) and the couplers 532 and 542 can be formed on a substrate 1202 of the die 1200. A plurality of connection pads 1204 can also be formed on the substrate 1202 to facilitate functionalities associated with at least some portions of the front-end architecture 500.

FIG. 12B shows that in some implementations, a portion of a front-end architecture can be part of a semiconductor die 1210. By way of an example, a second portion of the front-end architecture 500 in FIG. 5 including the ASM 550 and the coupler 552 can be formed on a substrate 1212 of the die 1210. A plurality of connection pads 1214 can also be formed on the substrate 1212 to facilitate functionalities associated with at least some portions of the front-end architecture 500.

FIG. 12C shows that in some implementations, a portion of a front-end architecture can be part of a semiconductor die 1220. By way of an example, a third portion of the front-end architecture 500 in FIG. 5 including the diplexer circuit 570 (e.g., including with the first elliptic filter 562, the second elliptic filter 564, the first electrostatic discharge (ESD) network 566, and the second ESD network 568) can be formed on a substrate 1222 of the die 1220. A plurality of connection pads 1224 can also be formed on the substrate 1222 to facilitate functionalities associated with at least some portions of the front-end architecture 500.

Figure 13:
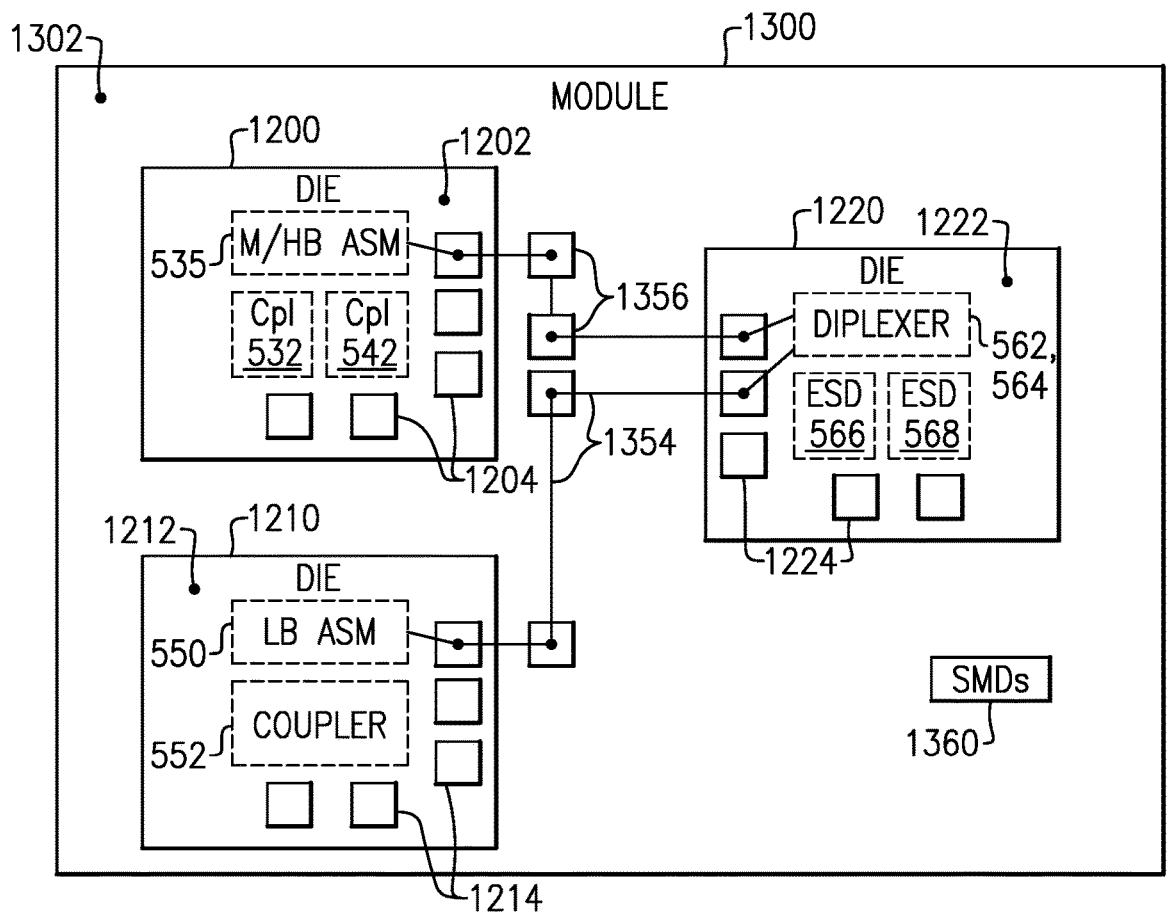
FIG. 13 is a schematic diagram of a module including the second front-end architecture in accordance with some implementations.

In some implementations, one or more features described in FIGS. 12A-12C can be included in a module. For example, FIG. 13 is a schematic diagram of a module 1300 including the front-end architecture 500 in FIG. 5 in accordance with some implementations. While some example features are illustrated, those skilled in the art will appreciate from the present disclosure that various other features have not been illustrated for the sake of brevity and so as not to obscure more pertinent aspects of the example implementations disclosed herein. The module 1300 includes: a packaging substrate 1302; a first die 1200; a second die 1210; a third die 1220; and one or more wirebonds 1354 and one or more connection pads 1356 for connecting die 1200, 1210, and 1220.

In some implementations, the components mounted on the packaging substrate 1302 or formed on or in the packaging substrate 1302 can further include, for example, one or more optional surface mount devices (SMDs) 1360. In some implementations, the packaging substrate 1302 can include a laminate substrate.

In some implementations, the module 1300 can also include one or more packaging structures to, for example, provide protection and facilitate easier handling of the module 1300. Such a packaging structure can include an overmold formed over the packaging substrate 1302 and dimensioned to substantially encapsulate the various circuits and components thereon.

It will be understood that although the module 1300 is described in the context of wirebond-based electrical connections, one or more features of the present disclosure can also be implemented in other packaging configurations, including flip-chip configurations.

Figure 14:
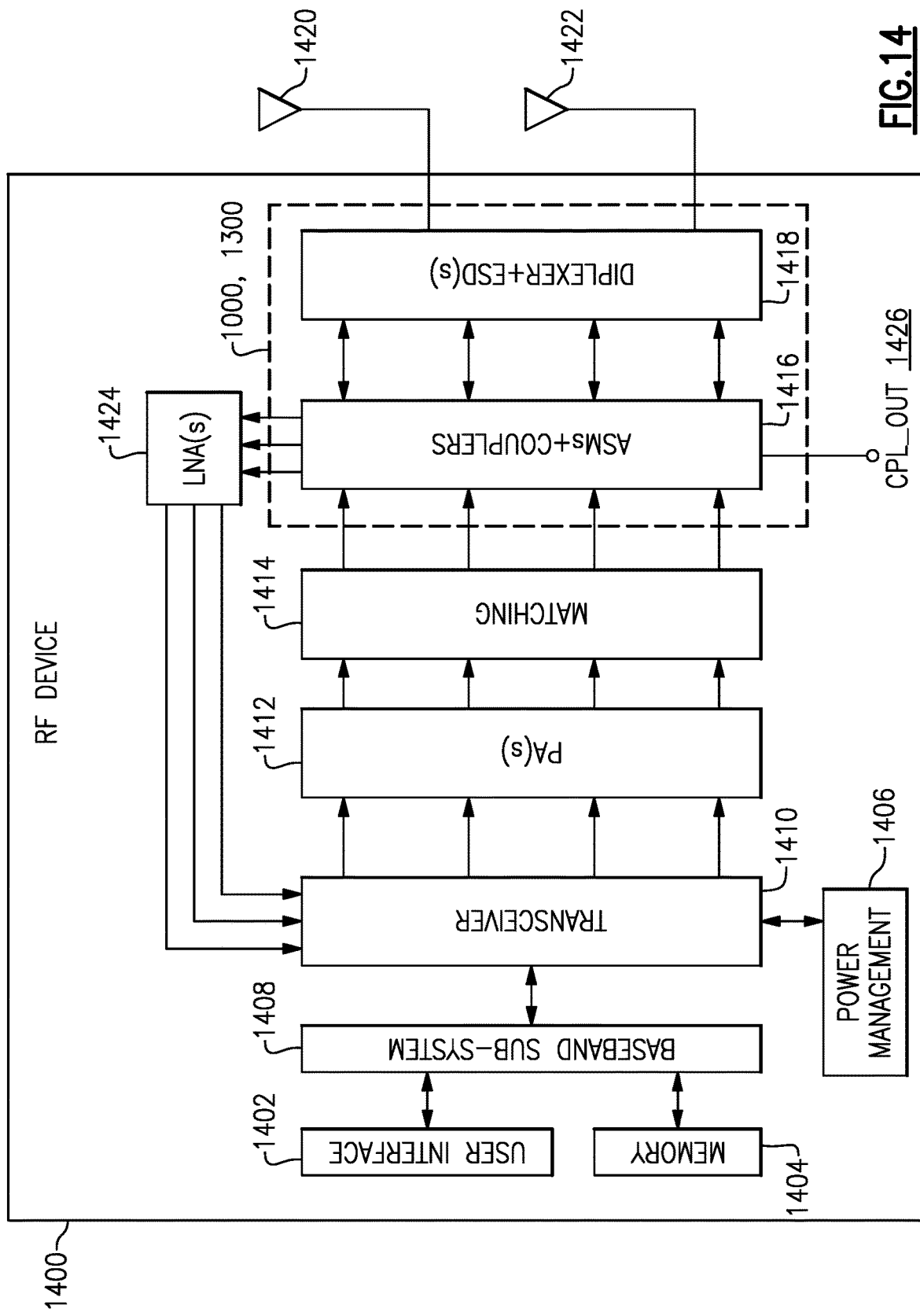
FIG. 14 is a schematic diagram depicting an example radio-frequency (RF) device having one or more advantageous features described herein.

FIG. 14 schematically depicts an example radio-frequency (RF) device 1400 having one or more advantageous features described herein. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, the RF device 1400 is a wireless device. In some implementations, such a wireless device can include, for example, a cellular phone, a smart-phone, a hand-held wireless device with or without phone functionality, a wireless tablet, a wireless router, a wireless access point, a wireless base station, or the like.

In some implementations the RF device 1400 includes one or more power amplifier (PAs) in a PA module 1412 configured to receive their respective RF signals from a transceiver 1410 that can be configured and operated in known manners to generate RF signals to be amplified and transmitted, and to process received signals. In some implementations, the PA module 1412 can include one or more filters and/or one or more band/mode selection switches configured to provide duplexing and/or switching functionalities as described herein. The transceiver 1410 is shown to interact with a baseband sub-system 1408 that is configured to provide conversion between data and/or voice signals suitable for a user and RF signals suitable for the transceiver 1410. The transceiver 1410 is also shown to be connected to a power management component 1406 that is configured to manage power for the operation of the RF device 400. In some implementations, the power management component 1406 can also control operations of the baseband sub-system 1408 and other components of the RF device 1400.

The baseband sub-system 1408 is shown to be connected to a user interface 1402 to facilitate various input and output of voice and/or data provided to and received from the user. The baseband sub-system 1408 can also be connected to a memory 1404 that is configured to store data and/or instructions to facilitate the operation of the wireless device, and/or to provide storage of information for the user.

In some implementations, a matching network 1414 is provided between the PA module 1412 and the module 1000/1300. In some implementations, the module 1000 (as shown in FIG. 10) includes at least some of the components of the front-end architecture 200 in FIG. 2 such as one or more combined antenna switch modules (ASMs) and couplers 1416 (e.g., the ASM 230 and the coupler 232) and a combined diplexer and ESD network 1418 (e.g., the diplexer circuit 258). According to some implementations, the module 1000 is connected to a common antenna 1420.

In some implementations, the module 1300 (as shown in FIG. 13) includes at least some of the components of the front-end architecture 500 in FIG. 5 such as one or more combined antenna switch modules (ASMs) and couplers 1416 (e.g., the ASM 550 and the coupler 552) and a combined diplexer and ESD network 1418 (e.g., the diplexer circuit 570). According to some implementations, the module 1300 is connected to antennas 1420 and 1422.

As shown in FIG. 14, some received signals are shown to be routed from the combined ASM and coupler 1416 to one or more low-noise amplifiers (LNAs) 1424. Amplified signals from the one or more LNAs 1424 are shown to be routed to the transceiver 1410. According to some implementations, the PA module 1412, the matching network 1414, the combined ASMs and couplers 1416, and/or the combined diplexer and ESD network 1418 comprise at least a portion of a front-end architecture (e.g., the front-end architecture 200 in FIG. 2 or the front-end architecture 500 in FIG. 5). In some implementations, the one or more combined antenna switch modules (ASMs) and couplers 1416 provide a coupled signal to a coupler node 1426.

A number of other wireless device configurations can utilize one or more features described herein. For example, the RF device 1400 does not need to be a multi-band device. In another example, the RF device 1400 can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | TX Frequency Range (MHz) | RX Frequency Range (MHz) |
| --- | --- | --- | --- |
| B1 | FDD | 1,920-1,980 | 2,110-2,170 |
| B2 | FDD | 1,850-1,410 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,400-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |

TABLE 1-continued

| Band | Mode | TX Frequency Range (MHz) | RX Frequency Range (MHz) |
|---|---|---|---|
| B30 | FDD | 2,305-2,315 | 2,350-2,360 |
| B31 | FDD | 452.5-457.5 | 462.5-467.5 |
| B33 | TDD | 1,400-1,920 | 1,400-1,920 |
| B34 | TDD | 2,010-2,025 | 2,010-2,025 |
| B35 | TDD | 1,850-1,410 | 1,850-1,410 |
| B36 | TDD | 1,930-1,990 | 1,930-1,990 |
| B37 | TDD | 1,410-1,930 | 1,410-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

For the purpose of description, it will be understood that "multiplexer," "multiplexing" and the like can include "diplexer," "diplexing" and the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some implementations of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of implementing a radio-frequency module comprising:
providing a packaging substrate configured to receive a plurality of components;
providing a first die implemented on the packaging substrate, the first die including a first antenna switch module configured to provide switching for a first frequency band, the first antenna switch module coupled to a first node associated with a first antenna, the first die including a first coupler configured to couple a signal associated with the first antenna switch module;
providing a second die implemented on the packaging substrate, the second die including a second antenna switch module configured to provide switching for a second frequency band and a third antenna switch module configured to provide switching for a third frequency band, the second antenna switch module coupled to the first node associated with the first antenna, the third antenna switch module coupled to a second node associated with a second antenna, the second die including a second coupler configured to couple a signal associated with the second antenna switch module and a third coupler configured to couple a signal associated with the third antenna switch module;
providing a third die implemented on the packaging substrate, the third die including a diplexer circuit including a first filter coupled to the first antenna switch module and configured to pass the first frequency band, a second filter coupled to the second antenna switch module and configured to pass the second frequency band, a first electrostatic discharge network configured to dissipate electrostatic energy associated with the first frequency band and the second frequency band from the first node associated with the first antenna, the first electrostatic discharge network coupled to the first filter and the second filter, and a second electrostatic discharge network configured to dissipate electrostatic energy associated with the third frequency band from the second node associated with the second antenna; and
providing a multiplexor assembly configured to select a signal from one of the first coupler or the second coupler for output to a coupler output node.

2. The method of claim 1 wherein the first filter and the second filter are coupled to the first antenna.

3. The method of claim 1 wherein the first electrostatic discharge network is coupled to the first antenna and the second electrostatic discharge network is coupled to the second antenna.

4. The method of claim 1 wherein the second electrostatic discharge network is coupled to the third antenna switch module.

5. The method of claim 1 further comprising providing a fourth die including a plurality of power amplifiers and a plurality of filters.

6. The method of claim 5 wherein the fourth die includes a first power amplifier for a transmission signal associated with the first frequency band and a second power amplifier for a transmission signal associated with the second frequency band.

7. The method of claim 6 wherein the first power amplifier is coupled to a transmission node of the first antenna switch module and the second power amplifier is coupled to a transmission node of the second antenna switch module.

8. The method of claim 1 wherein at least a portion of the diplexer circuit is conjugately matched with one or more of the first antenna switch module, the second antenna switch module, or the third antenna switch module.

9. The method of claim 1 wherein one or more ports of one or more of the first antenna switch module, the second antenna switch module, or the third antenna switch module include integrated notch filters.

10. The method of claim 1 wherein one or more of the first coupler, the second coupler, or the third coupler are bidirectional.

11. The method of claim 1 wherein at least one of the first filter and the second filter is an elliptic filter.

12. A method of implementing a wireless device comprising:
providing a transceiver configured to process radio-frequency signals;
providing a first antenna and a second antenna; and
providing a radio-frequency module including a first die including a first antenna switch module configured to provide switching for a first frequency band, the first antenna switch module coupled to the first antenna, the first die including a first coupler configured to couple a signal associated with the first antenna switch module, the radio-frequency module further including a second die including a second antenna switch module configured to provide switching for a second frequency band and a third antenna switch module configured to provide switching for a third frequency band, the second antenna switch module coupled to the first antenna, the third antenna switch module coupled to the second antenna, the second die including a second coupler configured to couple a signal associated with the second antenna switch module and a third coupler configured to couple a signal associated with the third antenna switch module, the radio-frequency module further including a third die including a diplexer circuit including a first filter coupled to the first antenna switch module and configured to pass the first frequency band, a second filter coupled to the second antenna switch module and configured to pass the second frequency band, a first electrostatic discharge network configured to dissipate electrostatic energy associated with the first frequency band and the second frequency band from the first antenna, the first electrostatic discharge network coupled to the first filter and the second filter, and a second electrostatic discharge network configured to dissipate electrostatic energy associated with the third frequency band from the second antenna, the radio-frequency module further including a multiplexor assembly configured to select a signal from one of the first coupler or the second coupler for output to a coupler output node.

13. The method of claim 12 wherein the first filter and the second filter are coupled to the first antenna.

14. The method of claim 12 wherein the first electrostatic discharge network is coupled to the first antenna and the second electrostatic discharge network is coupled to the second antenna.

15. The method of claim 12 wherein the second electrostatic discharge network is coupled to the third antenna switch module.

16. The method of claim 12 wherein the radio-frequency module includes a fourth die including a plurality of power amplifiers and a plurality of filters.

17. The method of claim 16 wherein the fourth die includes a first power amplifier for a transmission signal associated with the first frequency band and a second power amplifier for a transmission signal associated with the second frequency band.

18. The method of claim 12 wherein at least a portion of the diplexer circuit is conjugately matched with one or more of the first antenna switch module, the second antenna switch module, or the third antenna switch module.

19. The method of claim 12 wherein one or more ports of one or more of the first antenna switch module, the second antenna switch module, or the third antenna switch module include integrated notch filters.

20. A method of implementing a radio-frequency packaged module comprising:
providing a packaging substrate configured to receive a plurality of components;
providing a first die implemented on the packaging substrate, the first die including a first antenna switch module configured to provide switching for a first frequency band, the first antenna switch module coupled to a first node associated with a first antenna;
providing a second die implemented on the packaging substrate, the second die including a second antenna switch module configured to provide switching for a second frequency band and a third antenna switch module configured to provide switching for a third frequency band, the second antenna switch module coupled to the first node associated with the first antenna, the third antenna switch module coupled to a second node associated with a second antenna; and
providing a third die implemented on the packaging substrate, the third die including a diplexer circuit including a first filter coupled to the first antenna switch module and configured to pass the first frequency band, a second filter coupled to the second antenna switch module and configured to pass the second frequency band, a first electrostatic discharge network configured to dissipate electrostatic energy associated with the first frequency band and the second frequency band from the first node associated with the first antenna, the first electrostatic discharge network coupled to the first filter and the second filter, and a second electrostatic discharge network configured to dissipate electrostatic energy associated with the third frequency band from the second node associated with the second antenna, at least a portion of the diplexer circuit conjugately matched with one or more of the first antenna switch module, the second antenna switch module, or the third antenna switch module.

* * * * *